Sept. 11, 1934.                E. BROOKS                1,973,045
                     GUIDING MEANS FOR CORN PICKERS
                       Filed Dec. 13, 1930        2 Sheets-Sheet 2

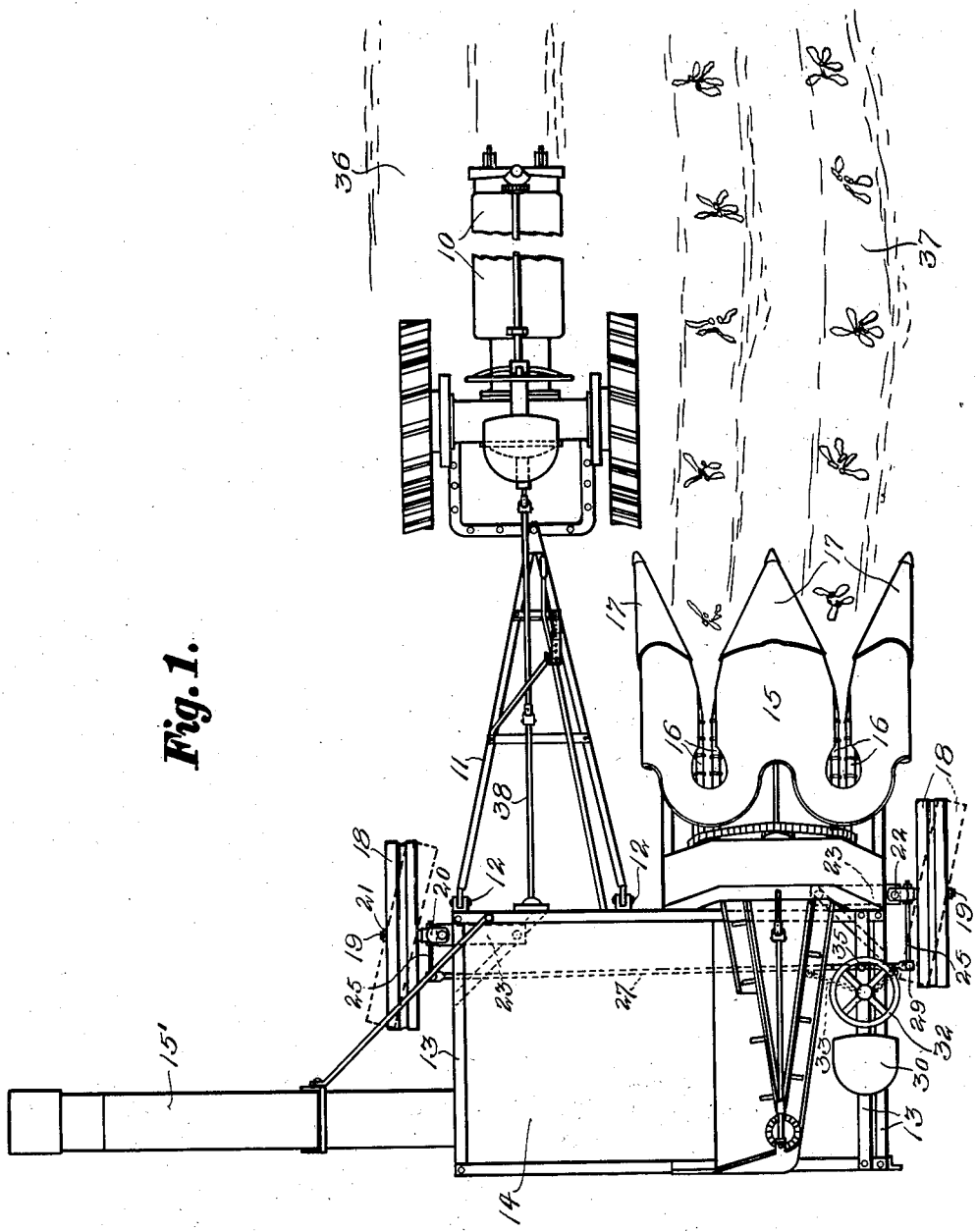

Inventor
Earl Brooks
By Arthur H. Sturges
Attorney

Patented Sept. 11, 1934

1,973,045

UNITED STATES PATENT OFFICE 1,973,045

GUIDING MEANS FOR CORN PICKERS

Earl Brooks, Stanton, Nebr.

Application December 13, 1930, Serial No. 502,221

1 Claim. (Cl. 280—96)

The present invention relates to agricultural machines, and more particularly to an improved construction in corn pickers.

An object of the present invention is to provide improved means for installation upon a corn picker for steering and guiding the same to maintain it in alignment with rows of corn plants, particularly when the same are curved or out of line.

Another object of the present invention is to provide an improved construction of steering means for corn pickers which may be adjusted so as to take up the side thrust incident to the lateral connection of the tractor, and which is provided with means for locking the steering apparatus when desired to hold the corn picker at the required offset angular position with respect to the tractor.

Another object of the present invention is to provide a construction of this character which embodies but few parts and which may be readily incorporated in a picker structure without alteration or change in the usual construction thereof.

With the foregoing and other objects in view, the invention will be more fully described hereinafter, and will be more particularly pointed out in the claims appended hereto.

In the drawings, wherein like symbols refer to like or corresponding parts throughout the several views.

Figure 1 is a top plan view of a corn picker with its tractor, the picker being provided with the improved or guiding means of this invention.

Figure 3:
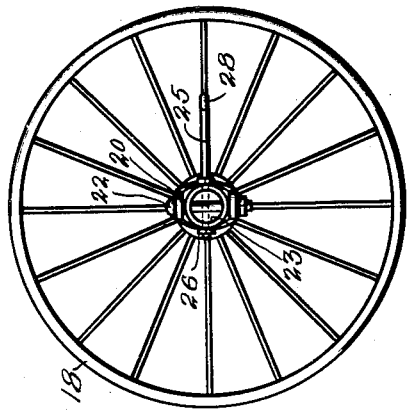
Figure 3 is an elevation of the inner side of one of the steering wheels showing the guiding attachment thereon.

Referring now to the drawings, and first to Figure 1, 10 designates a tractor of any suitable type for drawing and operating the corn picker. The tractor 10 is pivotally connected to the forward end of a drawbar 11 which preferably diverges at its rear end and is pivotally connected at 12 at spaced apart points to the forward side and adjacent one end of a corn picker frame 13. The frame 13 is substantially rectangular in plan and is provided toward its inner end, substantially in line with the drawbar 11, with husking mechanism 14 which leads to a laterally and inwardly extending elevator 15 adapted to overhang a wagon or other vehicle for carrying off the picked and husked ears of corn which may be conveyed to a storage bin, elevator or other suitable place for storage and use.

The outer end of the frame 13 is provided with a forwardly projecting picker member 15 of usual construction adapted for operation over two substantially parallel rows of corn plants. The picker member is provided with the usual corn stripping rollers 16 at the inner ends of the throats of the picker member, and the forwardly projecting portions of the picker member are provided with the usual guides 17.

The illustration of the corn picker is somewhat diagrammatic as the details thereof form no part of the present invention.

Figure 2:
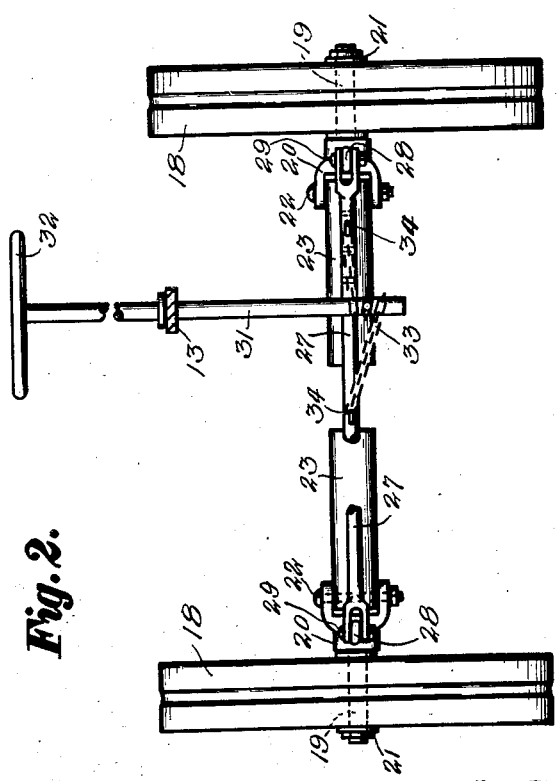
Figure 2 is a fragmentary rear elevation of the steering wheels and their adjacent parts, showing the improved guiding means applied thereto.
Figure 4:
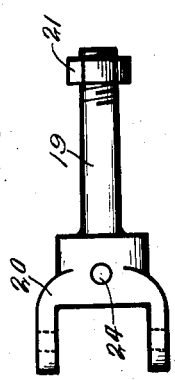
Figure 4 is a detail view showing in side elevation one of the stub axles for a steering wheel.

The picker frame 13 is supported at each end by a wheel 18. As may be seen from Figures 2, 3 and 4, each wheel 18 is mounted upon a stub axle 19 provided with a fork 20 at its inner end providing an abutment for the inner side of the hub of the wheel 18 and which also carries a nut 21 or the like on the outer end of the stub axle 19 for detachably holding the wheel 18 thereon. The fork 20 is disposed substantially vertically and is pivotally connected by means of a pin 22 to an adjacent axle section 23 which is bolted or otherwise suitably secured to the underside of the main frame 13 of the corn picker. These axle sections 23 may be disposed in transversely offset relation with respect to the line of draft as shown in Figure 1, or be mounted in any other suitable arrangement found desired and necessary.

Each fork 20 is provided at its inner end with a transverse opening 24 which may or may not be threaded to receive therethrough the forward end of a steering arm 25. The forward extremity of each steering arm 25 is provided with a binding nut 26 or the like for securing the arm 25 rigidly to the fork 20 so that the swinging of the arms 25 effect the corresponding swinging movements of the stub axles 19.

The arms 25 extend rearwardly from their respective forks 20 and are of different lengths depending upon the offset mounting of the axle sections 23 so as to dispose the rear ends of the arms 25 in transverse alignment. A connecting rod 27 extends between the rear ends of the arms 25 and the rod 27 may be forked at opposite ends to engage over eyes 28 on the rear ends of the arms 25 and to receive coupling bolts 29 which pivotally connect the rod 27 to the arms 25.

Disposed forwardly of the seat 30 of the corn picker is a substantially vertical steering shaft 31 mounted in the frame 13 and which at its upper end is provided with a hand wheel 32 adapted to be rotated for turning the shaft 31.

The lower end of the shaft 31 carries a chain 33 which is anchored intermediate its ends to the shaft 31 and which is rolled thereon in opposite directions, the opposite ends of the chain 33 being connected by eyes 34 or the like to the connecting rod 27 at points spaced from the opposite sides of the shaft 31.

The frame 13 is provided with a locking pin 35 which is disposed vertically in alignment with the rear edge portion of the connecting rod 27 when the latter is shifted forwardly by the turning of the wheels 18 to the desired extent and at an angle to the line of draft, as shown in Figure 1. The pin 35 is adapted to be moved downwardly against the rod 37 to hold it from moving backwardly, and thus hold the wheels 18 in their angular adjustment.

In operation, the tractor 10 is adapted to travel over the unharvested ground as indicated at 36 in Figure 1, while the corn picker is adapted to travel behind the tractor at one end and to project at its other or outer end over a section of the unharvested ground, as indicated at 37 in Figure 1.

The picker member 15 extends forwardly from the outer end of the picker and is adapted to register with two adjacent rows of the corn and, if the rows vary from a straight path, as shown in Figure 1, the attendant on the seat 30 may operate the hand wheel 32, when the pin 35 is released from the connecting rod 27, to swing the steering wheels 18 and thus move the picker transversely of the line of draft and maintain a fairly accurate register of the picker member 15 with the corn rows.

By thus guiding the picker to accurately register the picker member 15 with the corn rows, the knocking down of the corn plants is prevented without the ears being stripped therefrom and there is also obviated the necessity of hand picking the corn after the passage of the picker thereover which results in an increase in the cost of labor.

The mechanism of the corn picker may be operated from the tractor through a suitable power take-off shaft 38 which may be disposed adjacent to the drawbar 11.

In order to overcome the side draft incident to the connection of the tractor 10 through the drawbar 11 and the inner end of the frame 13, the steering wheels 18 may be adjusted into an outwardly turned or angular position, such as shown in Figure 1, and the pin 35 may then be moved into position to lock the wheels when set. Of course when the transverse alignment of the picker is to be changed to meet conditions of irregular corn rows, the pin 35 may be quickly released and the hand wheel 32 operated.

It is obvious that various changes and modifications may be made in the details of construction and design of the above specifically described embodiment of this invention without departing from the spirit thereof, such changes and modifications being restricted only by the scope of the following claim:

What is claimed is:—

A corn picking device, comprising a corn picker having a wide frame with a single pivoted supporting wheel at each side of the frame, picking fingers projecting forwardly from one side portion of the frame, steering means interconnecting said supporting wheels and having a hand wheel at said side portion of the frame, and a tractor engaging draft device mounted on and extending forwardly from the other side portion of the frame, said hand wheel being disposed substantially in line with said picking fingers to enable the operator to maintain the frame in line relative to the fingers and the rows of corn to be picked irrespective to any side draft imposed through said draft device.

EARL BROOKS.